March 9, 1937. F. W. PEEL 2,073,318
AIRPLANE
Filed Aug. 30, 1935 4 Sheets-Sheet 1
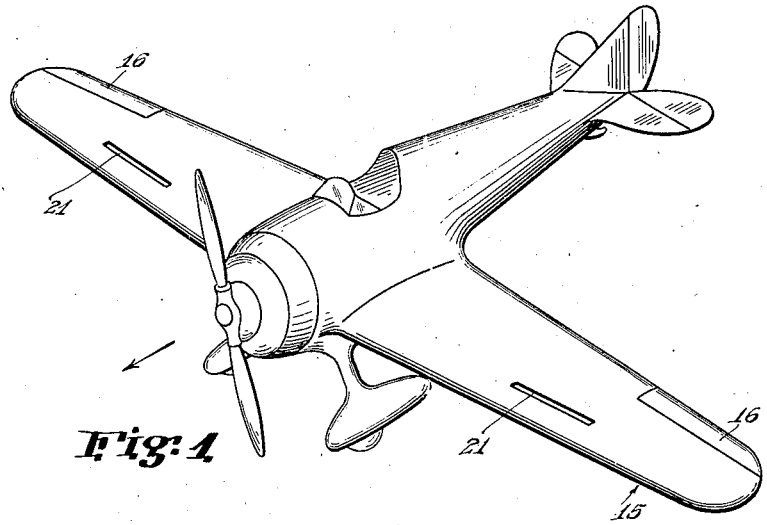
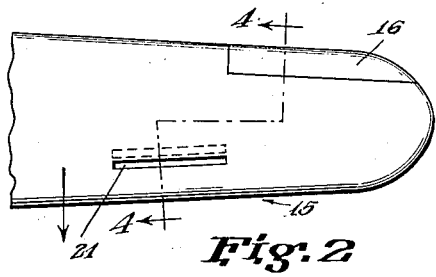
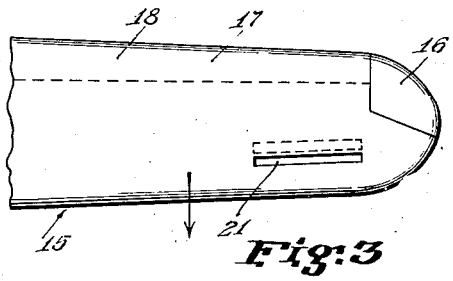
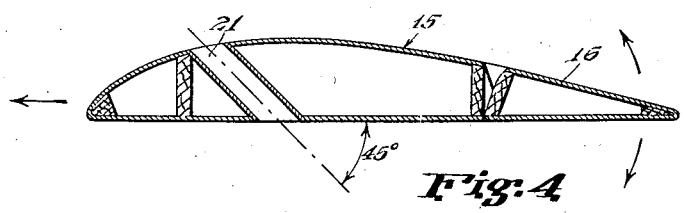
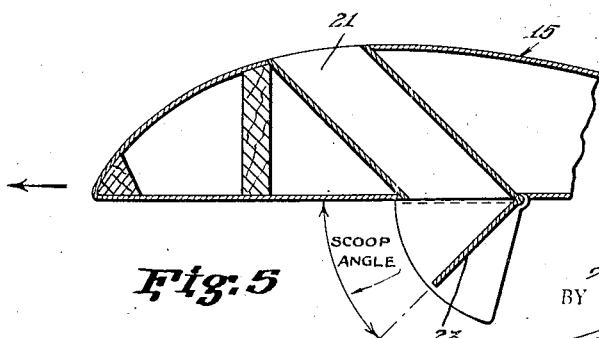
INVENTOR.
Frederick W. Peel
BY
ATTORNEY.

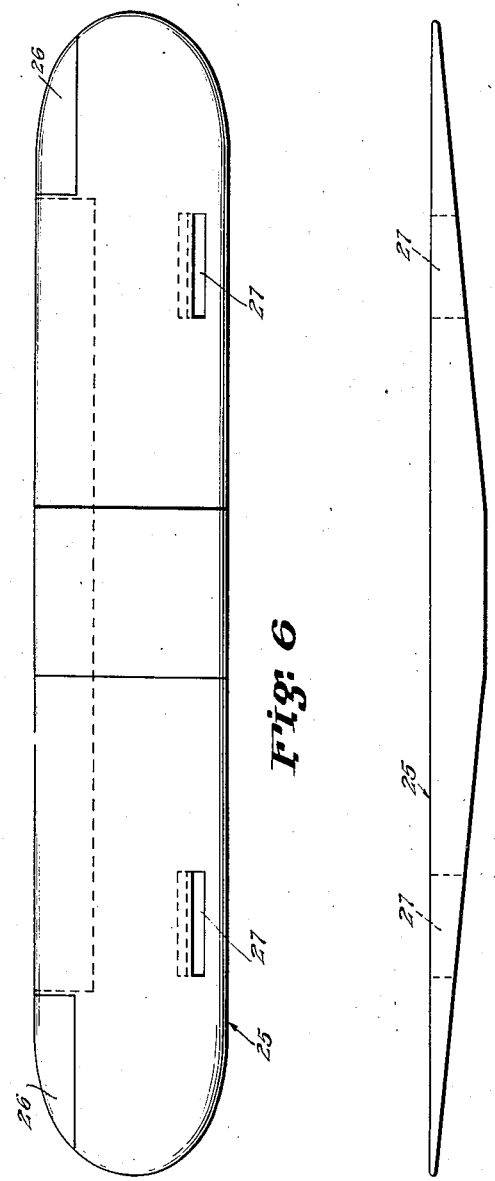

March 9, 1937.    F. W. PEEL    2,073,318
AIRPLANE
Filed Aug. 30, 1935    4 Sheets-Sheet 3

A-MAXIMUM OPENING OF SPOILER WITH FLAPS DOWN 50°
B-MAXIMUM OPENING OF SPOILER WITH FLAPS CLOSED
C-MAXIMUM MOVEMENT OF CONVENTIONAL AILERON R.D. 20° L.U.28°
D-MAXIMUM MOVEMENT OF SKEWED AILERON, SAME AREA
  AS CONVENTIONAL AILERON R.D. 20° L.U.28°
E-MAXIMUM MOVEMENT OF SKEWED AILERON WITH FLAPS
  DOWN 50° R.D. 20° L.U. 28°

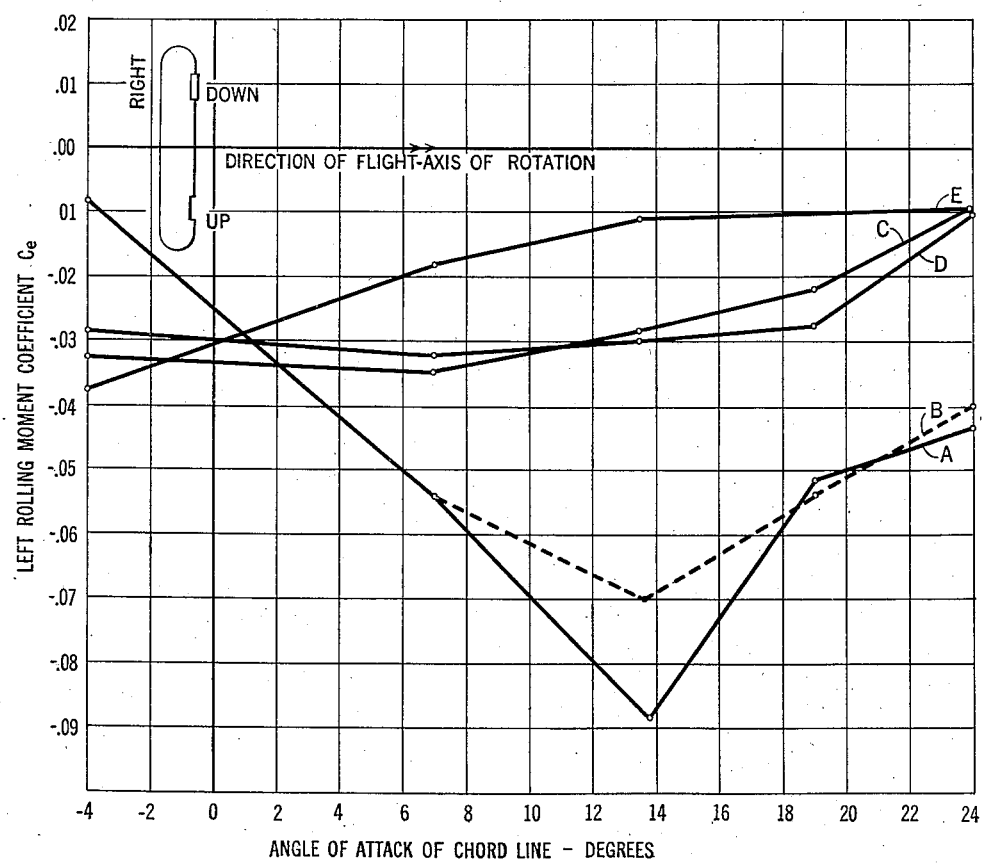

Fig. 8

ROLLING MOMENT COEFFICIENTS
5-FOOT WIND TUNNEL TEST
40 M.P.H. (STD. AIR)-SPECIAL BALANCE

INVENTOR.
Frederick W. Peel
BY
Samuel Ostrolenk
ATTORNEY.

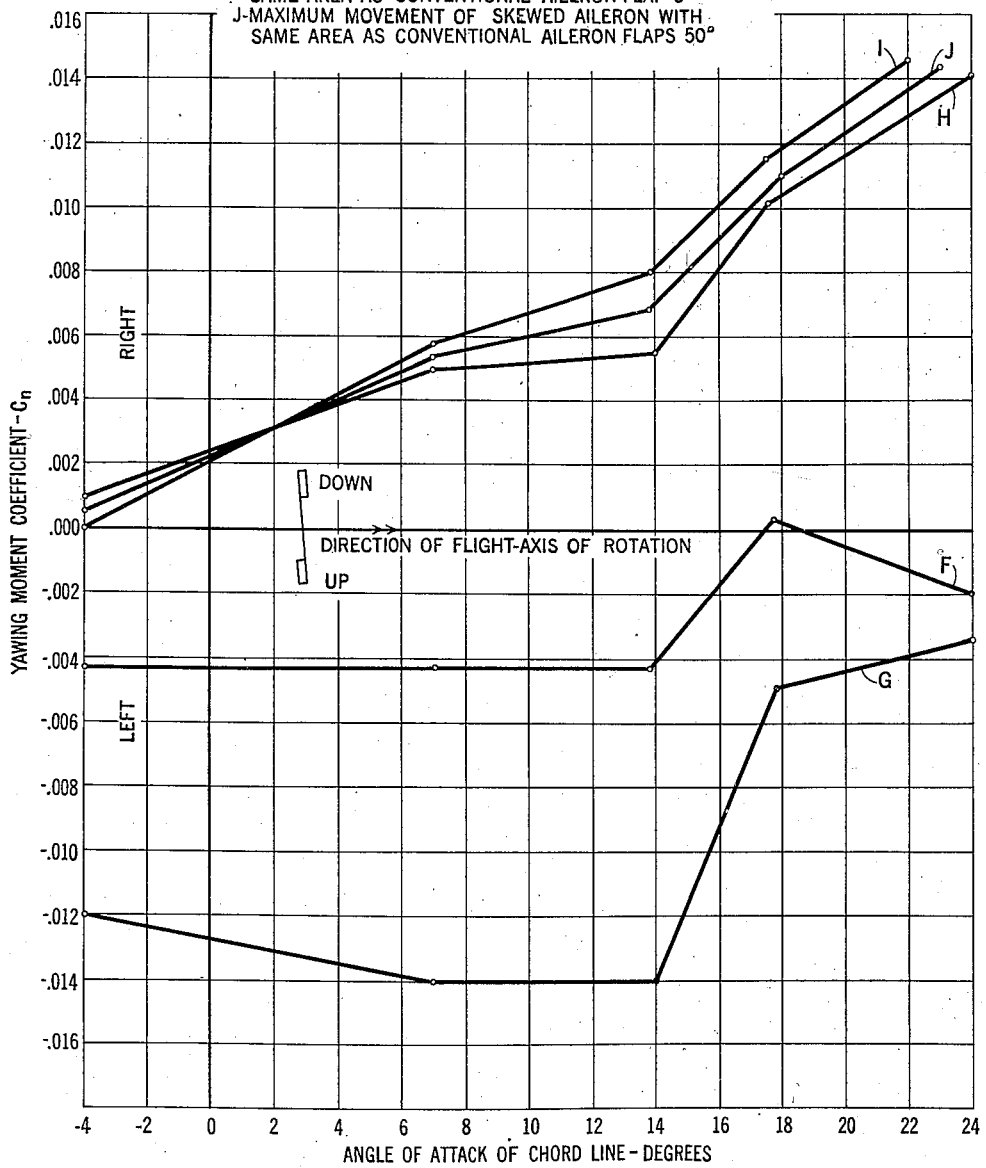

Patented Mar. 9, 1937

2,073,318

UNITED STATES PATENT OFFICE 2,073,318

AIRPLANE

Frederick W. Peel, Bedford, Va., assignor to L. P. R. Company, New York, N. Y., a corporation of Delaware Application August 30, 1935, Serial No. 38,563

6 Claims. (Cl. 244—90)

My invention relates to novel apparatus for and methods of operating airplanes, and more particularly, relates to novel apparatus for and methods of obtaining lateral control in an airplane.

In the development of airplane devices providing increased lifting coefficient, such as flaps, it has been found that to obtain maximum efficiency from the flap, it is necessary to extend it along as much of the trailing edge area as possible. However, of the trailing edge area of the present designed airplanes, a large proportion is necessarily used for aileron mounting, to provide the necessary lateral control. In fact one of the serious handicaps in obtaining a high maximum lift coefficient is the inability to maintain lateral control with any of the present type of controls now known in the art.

The subject of lateral control has formed the basis for a considerable body of investigation and many solutions have been proposed.

Probably the best known and the most widely used heretofore is the conventional aileron, pivotally mounted in the trailing portion and at the tips of the wing.

These ailerons function to either increase or decrease the lifting area of the wing, depending on whether the flap is moved to its lowermost position to increase the camber of the wing or is moved upwardly to a position in which it decreases the pressure differential between the upper and lower surfaces.

As is well known to those skilled in the art, and as is clear from this principle of operation, the effectiveness of these ailerons to vary the lift coefficient of the wing depends upon the speed of the plane and is accordingly most effective at negative or low angles of attack as well as at normal angles of incidence of flight.

The ailerons by reason of their location along the trailing edge of the wing and near its tips are acting in a field where the air tends to burble as the angle of attack is increased.

Accordingly as the angle of attack is increased, the effectiveness of the aileron is proportionately decreased until at or near the burbling point the ailerons are substantially ineffective.

But at high angles of attack, lateral control is just as essential, if not more so, than at normal angles of flight, and it is the attempt to use these ailerons at high angles of attack to produce the necessary rolling moment which is the cause of many airplane accidents.

I have discovered that a substantial portion of available area may be used for any type of flaps, and at the same time, as much or more lateral control is obtained.

More specifically I have discovered that by combining suitable construction of aileron with a proper construction of spoiler extending at a critical angle and arranged close to the leading edge of the wing, I can obtain the necessary lateral control over the entire range of operations of the plane from a negative angle of incidence to the maximum positive angle of attack, including the full range of speed of the plane.

Accordingly, an object of my invention is to provide novel apparatus for and methods of stabilizing the wing laterally throughout the range of operations of the plane.

A further object of my invention is to provide a novel combination of aileron and spoiler for lateral control.

Still another object of my invention is to provide separate and independent novel means for controlling the lateral stabilization of the plane at low angles of incidence and high angles of attack.

Still another object of my invention is to provide a novel construction of spoiler and of aileron.

There are other objects of my invention which together with the foregoing will appear in the detailed description which is to follow in connection with the drawings in which:

Figure 1 is a perspective view of an airplane showing the relative arrangement of spoilers and conventional ailerons.

Figure 2 is a fragmentary plan view of spoiler and aileron in accordance with my invention.

Figure 3 is a fragmentary plan view of spoiler, flap and aileron in accordance with my invention.

Figure 4 is a cross section of the wing showing the opening or spoiler.

Figure 5 is a cross section of a wing showing a modified construction of spoiler with a scoop.

Figures 6 and 7 are modified forms of my invention.

Figure 8 is a series of rolling moment curves where spoilers, conventional ailerons, and skewed ailerons with flaps are used.

Figure 9 is a series of yawing moment curves, for spoilers, conventional ailerons and skewed ailerons.

Referring now more specifically to Figure 2, I have disclosed a wing section 11 relatively thin and having near its tip the spoiler opening 21. Conventional ailerons 14 are mounted along the trailing edge near the tips as shown.

In Figure 8, curve C was obtained with the conventional ailerons placed at their maximum differential movement of right down 20 degrees, left up 28 degrees. It will be noted that conventional ailerons in this setting have a very strong rolling moment coefficient (—.032) low angles of attack (—4°). However, at the points where this maximum movement of the ailerons would be actually needed, such as in points of stall (16°), the rolling moments coefficient are very noticeably decreased (—.025), and at 19° this rolling moment coefficient has further reduced to (—.022). This not only bears out in this special wing curve, but in any conventional wing curve.

Referring now to Figure 3, I show the same type of airfoil section as was used in Figure 1, with the exception that the conventional ailerons have been replaced by flaps and skewed ailerons.

In Figures 2 to 5, I have shown airplane wings embodying various forms of my invention. In Figure 3 wing section 15 is provided with skewed ailerons 16 at the tips and trailing edge of the wing, and flap 17 pivoted in any well known manner as at 18 and arranged to be controlled by the pilot in any well known manner, not shown.

A spoiler opening 21 extending from the lower to the upper surface of the wing is formed near the ends of the wing. It will be noted that the spoiler opening has a slope extending forwardly from the bottom to top toward the leading edge. The direction of this slope is essential to my invention for reasons which will appear hereinafter. I have discovered that the angle of this slope is also critical and must be within the order of 45°. I have in the present illustration shown the critical angle of 45° formed between the leading wall of the spoiler and the lower surface of the wing. The leading edge at the upper wing surface of the spoiler opening is determined by the location of the front spar. This construction as will be shown from the curves in connection therewith, produces desirable rolling moments over a complete range of operations of the wing from zero to maximum angle of attack.

The angle of cut of the opening has been found not only to effect an increased spoiler action but when the plane is flown upside down, the portion of the wing between the spoiler and the leading edge acts as an auxiliary foil and adds to the safety of operation by producing desired increased lift.

In Figure 5, the spoiler opening 21 is provided with an end plate, or shutter 23 pivotally mounted for rocking operations to any desired position from one in which the spoiler opening is closed to one in which it is open.

In practice the skewed aileron 16 and shutter plate 23 are interconnected so as to be jointly operated in such a relation that when the aileron is lowered to increase the camber for increased lift or rolling moment on that side of the wing, the spoiler opening is simultaneously closed and vice versa.

As will be explained hereinafter, the aileron is most effective at relatively low angles of attack. When the forward speed has been reduced to a minimum, under these conditions a substantial amount of air leakage occurs from the positive pressure side of the wing towards the negative pressure region or suction side. The spoiler opening 21 produced by the movement of the shutter 23 to the position shown provides such an air leakage and thus substantially reduces the pressure differential between the upper and lower surfaces of the wing. That side of the wing, therefore, where this particular aileron is located loses lift and as a result produces the required rolling moment.

When the wing is of the extremely thin type, the fore and aft dimension of the shutter should be about 30% of the chord of the wing tip.

When the section of the wing is of more common thickness, provision must be made to keep the thickness ratio of the shutter low. Although I have disclosed a single shutter, it will be understood that two shutters are then individually pivoted, but function through a single connection to operate in unison. The upper shutter is so spaced that when closed it is flush with and produces a continuity of the upper surface of the wing, whereas the lower shutter is similarly spaced so that when closed, it is flush with and produces a continuity of the lower member of the wing, both of these members, it is understood, being shaped to suitably streamline with their respective surfaces of the wing.

When the members are rocked about their respective pivots to an open position, a gap is produced which provides an air passageway, as illustrated.

On Figure 8 curve D shows the results obtained with skewed ailerons at their maximum differential setting. The power of rotation was approximately the same as conventional ailerons. Curve E shows the power of rotation of the skewed ailerons in the same setting as D but with the flap set down to its maximum position which would be used to decrease landing speed, and in this position it is equivalent to the wing being at high angles of attack. It will be seen that the results of rolling moment in E were much weaker than D and C, at high angles of attack.

Neither conventional ailerons nor skewed ailerons showed they had as good a power of rotation at the high angles of attack as are desirable at the points of high maximum lift.

Curve A on Figure 8 illustrates the maximum rolling moment of the wing with the spoiler open at its maximum, and the flaps down 50°. Curve B shows the spoiler open to its maximum with the flaps closed. It will be noted that at low angles of attack neither spoilers A nor B, as shown by curves, have sufficient power of rotation. However, at the points where maximum lateral control is needed, which are at high angles of attack of an airfoil section, or close to the wing's burbling point, the spoiler showed far more rolling moment with the same area of conventional or skewed ailerons.

In practice when a pilot is about to make a turn, he must not only kick his rudder properly to produce the necessary turn, but because of the centrifugal force produced during turning, it is necessary to assist by properly tilting the wing. Thus, for example, if he is to make a right turn, the pilot will first raise the right aileron and drop the left aileron, decreasing the lift on the right section of the wing and increasing the lift on the left section. As a result the right section of the wing will drop and the left section will be raised.

However, because of the lowered position of the left aileron for producing the necessary increased lift, it has also resulted in a corresponding increase in the drag on the left section of the wing. Similarly, with the right aileron raised to decrease the lift thereat, the drag at this portion of the wing has been decreased. The result is that the increased drag at the left section of the wing and the decreased drag at the right section of the wing produce a resulting force tending to turn the wing in the opposite direction from the desired turn. This is known in aeronautical art as the unfavorable yawing tendency.

This same yawing action occurs when a turn to the left is to be made. In this case, as in the previous instance, the pilot operates his ailerons just before kicking his rudder, but in this case the right aileron being down produces the increased drag which cooperates with the decreased drag of the left aileron up to produce a turning moment about the right.

Although yawing has been partially eliminated by the use of differential ailerons and it is further eliminated by suitable action of the rudder, it cannot be entirely eliminated, and as a result a certain amount of side slip invariably occurs.

When a shutter and spoiler is used in accordance with my invention, the yawing moments are equalized by using any differential system.

By suitable adjustments of my ailerons in combination with the opening, I have discovered that I can take advantage of the desirable yawing moment produced by my spoiler opening to not only overcome the unfavorable yawing but to produce an action which assists the rudder.

At all angles of incidence, if the shutter is operated to provide an opening in the spoiler, the drag coefficient of the wing will be increased.

Accordingly, by suitably connecting the shutter of the spoiler to the aileron so that when the aileron is operated "up" to decrease the lift at the left wing section, the spoiler is opened, it will increase the drag sufficiently to at least compensate for the increased drag produced by the right aileron, thus preventing any unfavorable yawing.

From curve H of Figure 9 it will be noted that the tendency of a negative yaw of these conventional ailerons is very strong. This, as stated, is due to the additional drag caused from the down aileron, and on present designed airplanes is overcome in several ways, one is by increasing rudder area.

Figure 9 shows the negative yawing moment curves of the skewed ailerons set at their maximum differential position. Flaps at zero are disclosed in curve I and values obtained with the flaps down to their maximum movement shown in curve J.

In Figure 9 curves F and G show the spoiler with a positive yaw to the wing, which is naturally very desirable as this aids rotation, and would not have to be compensated by other surfaces.

As shown from the curves, the ailerons acting alone, shown in curves H, I, and J, produce a right yawing moment coefficient for left turns at normal angles of attack and in fact even when the wing is slightly negative.

As the angle of attack increases, the unfavorable yawing produced by the ailerons becomes even greater, particularly where the angular deflection of the aileron becomes very large.

In the curves F and G, on the other hand, the yawing moments produced with the spoiler open is shown as producing favorable or left turn yawing moment for a left turn until a most desirable value is reached at high angles of attack such as 14°. Further improvement in the yawing is obtained with the scoop at various angles.

In Figures 6 and 7, I have shown a wing 25, plan and front view of very great span. It is found that these wings 25 are more efficient, owing to the decrease of tip losses. In such a designed wing it is very difficult, owing to its structure, to place sufficient area at the extreme tips so that sufficient roll could be obtained at high angles without decreasing the flap area. However, it was found that by connecting the skewed or conventional ailerons 26 to an opening or spoiler 27, and allowing the spoiler to come into operation in the region of 6 degrees on up angle of attack, with the up movement only of the ailerons 26, that the power of rotation from this combination was uniform way past the maximum lift or stall. Also, the result of the positive and negative yawing moments being connected through this combination eliminated this undesirable tendency of the negative yaw.

Another advantage of this combination is that should it be desirable to go into combat or fly inverted in this position the lateral controls are reversed. Therefore the hole cut through the wing acts as a slot and helps to increase the lift, which is naturally very desirable.

Although for purposes of illustrating the principles of my invention I have disclosed a specific construction of spoiler and aileron, it will be understood that these may be varied in accordance with engineering principles for various designs of wings without departing from the spirit of my invention.

Thus the dimensions of the spoiler opening will depend on the airfoil used and the type of design of the plane. When the spoiler is used in combination with the auxiliary aileron in accordance with my invention, the area of the opening should be about ⅔ of that of the auxiliary aileron.

When the spoiler is used alone, it should be placed as close to the tips of the wing as is structurally feasible, with the long side extending parallel to the span of the wing and about twice in length of the width which extends along the chord of the wing. This will produce a spoiler shutter of low aspect ratio which will accordingly be effective for producing rolling moments even after burbling at high angles of attack of 20° or more.

When the auxiliary aileron is used in combination with the spoiler, the spoiler preferably should be long and narrow with its length approximately six or seven times its width.

With this construction, since the ailerons are to be used for producing rolling moments at low angles of attack, the location at the tip is the most effective.

Inasmuch as the spoiler is to function at high angles of attack, it is most effective when placed in the region of the wing where the lift coefficient is greatest. This position is usually about 30% of the wing chord from the leading edge, and about half way between the tips of the wing and the lateral center of pressure of the wing span.

Although the details of the spoiler opening are matters of engineering design which would depend upon the design of the wing itself, it is important to note that the rear wall of the opening should present a sharp edge at the top portion in order to meet the air flow filaments in a most desirable manner for improved spoiler effect.

It will be further understood, as has already been state that my invention may be used in combination with auxiliary airfoils and flaps, without affecting the operation thereof.

What is claimed is:

1. In an airplane wing, spoilers consisting of openings in the wing, extending from the lower to the upper surface of the wing, the side of the opening nearest the trailing edge of the wing forming an acute angle of the order of 45° with the upper surface of the wing and the side of the opening nearest the leading edge being substantially parallel to the first-mentioned side and forming an obtuse angle with the upper surface of the wing; a single shutter for each of said openings, and means for individually sliding said shutters to open and close said opening.

2. In an airplane wing spoilers consisting of openings in the wing, extending from the lower to the upper surface of the wing, the side of the opening nearest the trailing edge of the wing forming an acute angle of the order of 45° with the upper surface of the wing, and the side of the opening nearest the leading edge being substantially parallel to the first-mentioned side, and forming an obtuse angle with the upper surface of the wing; a single shutter for each of said openings, located at the lower surface of the wing, and means for individually sliding said shutters to open and close said opening.

3. In an airplane wing, spoilers consisting of openings in the wing, extending from the lower to the upper surface of the wing, the side of the opening nearest the trailing edge of the wing forming an acute angle of the order of 45° with the upper surface of the wing and the side of the opening nearest the leading edge being substantially parallel to the first-mentioned side and forming an obtuse angle with the upper surface of the wing; a single flat-shaped shutter for each of said openings located at the lower side of said wing, said shutters being slidably mounted for movement to cover said opening at the bottom of said wing, and for slidable movement into the wing for providing an unobstructed opening.

4. In an airplane a cambered wing, spoilers consisting of openings in the wing, extending from the lower to the upper surface of the wing, and located at the point of maximum lift of the wing, spoilers forming rectangular-shaped openings, the side of the opening nearest the trailing edge of the wing forming an acute angle of the order of 45° with the upper surface of the wing, and the side of the opening nearest the leading edge being substantially parallel to the first-mentioned side and forming an obtuse angle with the upper surface of the wing; a single flat shutter for each of said openings, and located along a lower surface of the wing, and means for individually operating said shutters to open and close said openings.

5. In an airplane wing, spoilers consisting of openings in the wing, extending from the lower to the upper surface of the wing, the side of the opening nearest the trailing edge of the wing forming an acute angle of the order of 45° with the upper surface of the wing and the side of the opening nearest the leading edge being substantailly parallel to the first-mentioned side and forming an obtuse angle with the upper surface of the wing; and means for restricting each of said openings.

6. In an airplane wing, spoilers consisting of openings in the wing, extending from the lower to the upper surface of the wing, the side of the opening nearest the trailing edge of the wing forming an acute angle of the order of 45° with the upper surface of the wing and the side of the opening nearest the leading edge being substantially parallel to the first-mentioned side and forming an obtuse angle with the upper surface of the wing; and independently operated closure means for said openings.

FREDERICK W. PEEL.